INTEGRATED CIRCUIT STATISTICAL SWITCH

Filed Dec. 30, 1966

INVENTORS
EDWARD M. CONNELLY
& JAMES H. WORTHEN
BY Hurvitz, Rose & Greene
ATTORNEYS United States Patent Office 3,441,911
Patented Apr. 29, 1969

3,441,911
INTEGRATED CIRCUIT STATISTICAL SWITCH

Edward M. Connelly and James H. Worthen, Springfield, Va., assignors to Melpar, Inc., Falls Church, Va., a corporation of Delaware Filed Dec. 30, 1966, Ser. No. 606,130
Int. Cl. G66f *11/00*
U.S. Cl. 340—172.5 12 Claims

ABSTRACT OF THE DISCLOSURE

A switching device in which the property of variable probability of passing or blocking a digital input signal is implemented by use of a recirculating shift register, a portion of the contents of which is applied to a gating circuit to direct the passage or blockage of the input signal, the contents of the shift register being selectively and continually modified in the recirculating loop according to the desired switch response to a specific input until a high probability of switch operation to manifest that response is assured.

Figure 1:
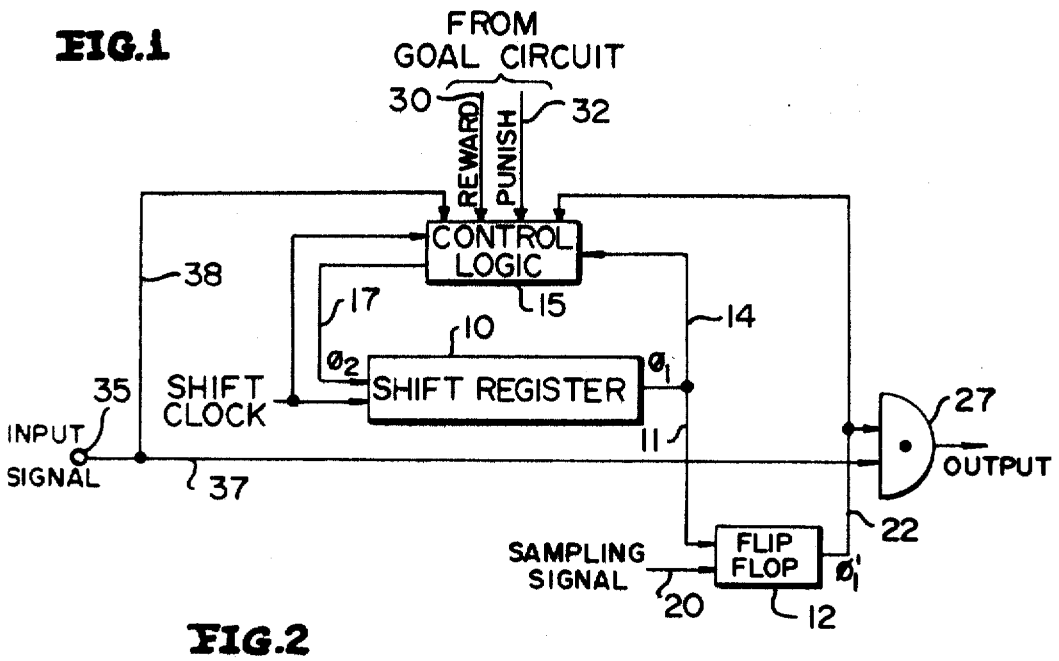

The present invention relates generally to machine intelligence systems of the type which are self-organizing to respond in a desired manner to external stimuli. The "learning" process of such systems, often termed learning networks or trainable networks, is accomplished by adjustment of internal behavioral patterns through reinforcement of disciplinary action, depending upon the immediately preceding network performance, such action being effected by training signals, characterized respectively as reward or punishment, generated by a goal circuit which may be programmed with network performance criteria and applied to a plurality of decision elements whose operating characteristics are variable in accordance with the training signals. More particularly, the present invention relates to decision elements for use in the trainable logical networks.

The general form of trainable logical network or self-organizing binary logical network under consideration here has been described extensively in the prior art and need not be elaborated upon here. See, for example, applications for U.S. Letters Patent of Lee, Ser. No. 160,965, filed Sept. 14, 1961 now Patent No. 3,327,291, entitled "Self-Synthesizing Machine," issued June 20, 1967; Halpern, Ser. No. 170,059, filed January 31, 1962 now Patent No. 3,262,101, entitled "Generalized Self-Synthesizer," issued July 19, 1966; and Connelly, Ser. No. 483,608, filed August 30, 1965. It is sufficient to state that such networks are capable of self-organization to any general connective of M input-N output variables to form desired Boolean logical functions. Each decision element usually comprises a switch which is operative to provide a connective (i.e., to permit passage of a logical function of the network input variables) or not, on a purely statistical basis in the untrained condition. Hence, the decision elements are generally designated "statistical switches."

When the network is initially "learning" the particular logical function to be synthesized or the operation to be performed, each statistical switch has equal probabilities (a probability of 0.5) of passing or blocking the function of the input variables (e.g., a canonical product). If the switch operates in the desired manner during any given decision interval, the switch is rewarded by the application of an appropriate training signal to the switch from the goal circuit. Each switch is provided with a plurality of operating states which are equated with levels of probability that the switch will be open or closed when the same input function is next applied. Rewarding a switch has the effect of increasing the probability that the switch will respond in the desired manner during the next decision interval, by changing the state of the switch in the direction of greater probability of the desired event. A punishment signal has the opposite effect, reducing the probability that the switch will operate incorrectly with respect to the "objective" or goal to be attained. Typically, each switch retains its ability to respond in a manner contrary to its previously applied training signal when subsequently called upon to make the same decision unless and until the input variables and the function to be derived therefrom are repetitive over a considerable number of decision intervals. At that time the switch attains a substantially non-statistical or deterministic limit.

The principal object of the present invention is to provide a statistical switch which is readily implemented in integrated circuit form and which is therefore a small, inexpensive, low power, and reliable device.

Briefly, according to the present invention the statistical switch comprises a multi-element or multi-stage shift register which is initially filled with binary ones and zeros in random distribution, a one-bit memory unit arranged and adapted to store the bit from the last stage of the shift register upon command of a sampling pulse, an AND gate arranged to receive the input function applied to the statistical switch and the contents of the one-bit memory unit for gating the stored bit as an output of the switch if the input function and memory contents are identical (e.g., both "one"), and a control logic circuit through which the contents of the shift register are continually circulated at a rate much greater than the switch sampling rate. The control logic circuit is also responsive to the training signals (reward and punish) generated by the goal circuit, to the output of the memory unit, and to the switch input, and is operative to complement the first recirculated bit of value opposite the value of the bit gated as an output from the switch provided the present state of the switch is rewarded. For example, if the output of the statistical switch is a logical "one," and the switch is rewarded, the control logic complements (inverts) the next recirculated zero bit; similarly, if the switch output is a logical zero and the switch is rewarded, the control logic complements the next recirculated "one" bit. The inverse process is employed if the output of the switch results in the application of a punish signal to the switch. In this manner, the contents of the shift register are rapidly modified so that each stage contains a bit having a value which will result in the desired logical output from the self-organizing binary logical network in which the switch is located. At that time the training of the network is completed.

Statistical switches in accordance with the present invention are readily fabricated by state-of-the-art integrated circuit techniques. For example, recent developments in the metal-oxide-silicon integrated-circuit technology have made possible the diffusion of over 100 active devices in a single 40-mil square silicon chip with excellent isolation between elements. Shift registers packaged in a single TO–5 can are also available, from General Microelectronics, for example, which will accept up to 100 bits of information. Hence, the switches required for an entire trainable logical network may be produced in microminiature form.

It is another object of the present invention to provide a statistical switch of relatively simple construction and capable of rapid training and re-training.

Figure 2:
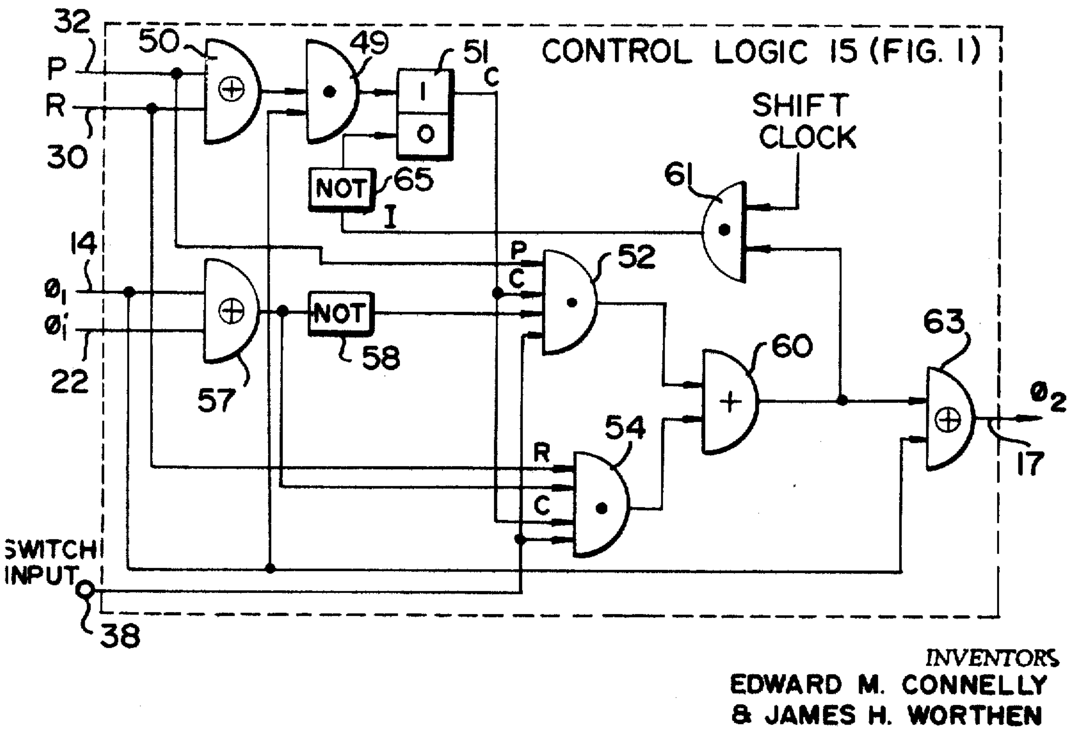

The above and still further objects, features and attendant advantages of the invention will become apparent from the following detailed description of a preferred embodiment thereof, especially when taken in conjunction with the accompanying drawings, in which:

FIGURE 1 is a circuit diagram of an embodiment of the statistical switch according to the invention; and FIGURE 2 is a circuit diagram of a suitable control logic circuit for the switch of FIGURE 1.

Referring now to FIGURE 1, the statistical switch includes a shift register having a capacity of twenty bits (i.e., twenty stages or elements), for example, and connected to a one-bit memory unit, such as flip-flop 12, so that the output of the last stage is available to the flip-flop via a path 11. The contents of the shift register are circulated through path 14, control logic circuit 15, and path 17. The flip-flop is adapted to store the end bit of the register upon command of a sampling signal which recurs at a frequency much less than the rate at which the contents of the shift register are circulated and to present the stored value as an input to AND gate 27. In essence, the content of the last stage (or output) of the shift register is sampled and stored in flip-flop 12, the flip-flop acting as a one-bit memory to retain the sampled value with concurrent application to AND gate 27. Retention of the binary value by the flip-flop until the next sampling signal is received is necessary to insure organization of the switch learning process throughout the training period. Alternatively, the sampling signal may be utilized to read out the contents of the memory. If the content of the flip-flop is a logical "1," the input function applied to the statistical switch at terminal 35 is gated through AND gate 27 as the switch output.

It will be observed that the memory content and the switch input are applied to AND gate 27 via paths 22 and 37, respectively. Since the memory output (FF12) must be a logical "1" in order to direct the input to the switch output, it will be apparent that this switch operation may be viewed as providing a connective between input and output of the switch.

The goal circuit (not shown), which is generally employed to test the logical output function of the entire trainable logical network of which the statistical switch is a part against the criteria programmed therein, operates to generate a reward or a punish signal for application to all statistical switches of the network according to whether the desired function has been formed or not, respectively. As will become apparent from the subsequent description of FIGURE 2, however, only those switches to which an input is applied (e.g., a canonical product of the input variables of the network, produced by a minterm generator) are responsive to the training signal from the goal circuit.

Rearward and punish signals are fed to control logic unit 15 of the statistical switch via paths 30 and 32, respectively. It will be clear, of course, that only a reward or a punish signal, not both, can be applied to the switch at any given instant of time.

In addition, the input function applied to the switch is fed into the control logic unit via a lead 38. Also, the shift clock signal is fed to the control logic circuit. Thus, control logic 15 has six inputs, only five of which are active at any one time, and is adapted to utilize this input information to modify or alter the contents of the shift register such that each bit of the shift register very rapidly assumes the binary value required to provide the desired connective for the switch input function.

In operation of the statistical switch of FIGURE 1, shift register 10 may be initially filled with a random distribution of "1's" and "0's." The specific initial distribution of bits is immaterial, as is the initial state of flip-flop 12. The contents of the shift register are continually recirculated through control logic unit 15 at a rapid rate, i.e., much greater than the switch sampling rate, as determined by the shift clock rate. The end bit (that is, the bit in the last stage) of the shift register is also applied to flip-flop 12, in essence a one-bit memory unit, which is implemented to assume the "1" state (e.g., set) upon application of a binary 1 and a sample pulse and the "0" state (e.g., reset) upon application of a binary 0 and a sample pulse. That is, upon application of a sampling pulse to the flip-flop, the shift register end bit is stored in the flip-flop (memory). If the memory content is a logical "1," AND gate 27 passes the input function as an output of the switch. The switch output will, along with the outputs of other statistical switches, affect the function formed by the trainable logical network containing the switches, and accordingly, a reward or a punish signal is applied to the control logical unit of each switch depending respectively upon whether or not the output function meets the goal circuit criteria.

If the switch output is a logical "1" and a reward is generated by the goal circuit, control logic unit 15 is operative to complement the next "0" bit fed thereto in the sequence of recirculating bits from the shift register. Similarly, a reward following a "0" ouput from the switch will result in the complementing of the next recirculated "1" bit by the control logic. The inverse process is employed for punish.

To this end, control logic unit 15 may be implemented as shown in the exemplary embodiment of FIGURE 2. The logic rules for the circuit of FIGURE 2 are as follows:

(1) If a reward is received, complement the next recirculating bit that is not identical to the value of the binary output of the memory (flip-flop 12) or if a punish signal is received complement the next recirculating bit that is identical to the value of the binary output of the memory (flip-flop 12).

(2) Reset the complement instruction (FF51, FIGURE 2) after each complement operation.

In logical symbolism, the rules may be stated:

$$I=C[R(\emptyset_1 \oplus \emptyset_1')+P\overline{(\emptyset_1 \oplus \emptyset_1')}] \quad (1)$$

$$\overline{C}=I \quad (2)$$

Having formulated the control logic rules, the implementation of the rules is achieved by well known logic circuit techniques. The reward and punish inputs are applied to an EXCLUSIVE-OR gate 50 which provides an output if one or the other, but not both, of the training signals is present at its input. The EXCLUSIVE-OR circuit output, "anded" with the switch input at AND gate 49, is fed to a flip-flop 51 to produce a complement instruction (e.g., binary "1") which is, in turn, applied in parallel to AND (logical product) gates 52 and 54. The EXCLUSIVE-OR (gate 50) output is connected (via AND gate 49) to an "A-C" input of FF51 such that the leading edge of a "true" waveform from gate 50 sets flip-flop 51. The punish and reward input leads are also connected to input terminals of AND gates 52 and 54, respectively.

Logic signals $\emptyset_1$ and $\emptyset_1'$ appearing on leads 14 and 22, respectively (FIGURE 1), are fed to EXLUSIVE-OR gate 57, the output terminal of that gate being connected in parallel to the input terminal of NOT (INVERTER) circuit 58 and an input terminal of AND gate 54. The output of NOT circuit 58 is fed as one input to AND gate 52. The final input to each of the AND gates is the switch input function on lead 38, also applied to AND gate 49.

An OR (logical sum) gate 60 is connected to receive the outputs of the two AND gates 52 and 54, and to furnish an input to AND gate 61 and to EXCLUSIVE-OR gate 63. The recirculated bits, which may or may not be altered by the control logic, according to the operational logic rules set forth above, are obtained as an output of control logic unit 15 from ENCLUSIVE-OR gate 63 having its second input from the last stage of the shift register.

The initial state of flip-flop 51 is irrelevant to the operation of the control logic unit 15 since the presence of a reward signal on lead 30 or a punish signal on lead 32 is effective to produce an output from EXCLUSIVE-OR gate 50, which when "anded" with the switch input shifts the state of flip-flop 51 to the "1" state, for example, if that flip-flop was previously in the "0" state, or effects no change if the flip-flop was previously in the "1" state. Simultaneously with the generation of C, an input is applied to AND gate 54 from EXCLUSIVE-OR gate 57, if the values of bits $\emptyset_1$ and $\emptyset_1'$ are non-identical, or to AND gate 52, if identical.

AND gate 52 produces an output, then, provided that a logical input function is applied to the switch, and a punish signal applied to the control logic unit (which of course results in the application of C to the gate), and the bits $\emptyset_1$ and $\emptyset_1'$ have identical binary values. In that event, it will be apparent that no output is produced at AND gate 54, which requires the presence of a reward, and non-identity of $\emptyset_1$ and $\emptyset_1'$, and a switch input.

An output from either AND gate is passed to EXCLUSIVE-OR gate 63 by OR gate 60 for recirculation as $\emptyset_2$ through the shift register. If all of the conditions required by either AND gate for production of an output therefrom are not met, the output of the control logic unit is simply the bit $\emptyset_1$ (i.e., $\emptyset_2=\emptyset_1$) applied to EXCLUSIVE-OR gate 63 via path 14.

It will be observed that since the rate of recirculation of the contents of shift register 10 is much greater than the switch sampling rate, the bit $\emptyset_1$ on which the control logic is presently operating may be several bits removed from that which was stored in flip-flop 12 to produce the memory output $\emptyset_1'$. Nevertheless, it has been found that the preceding operation rapidly results in the conversion of bit values in the shift register to effect maximum likelihood that the desired logical output function will be formed by the trainable network each time the input variables are applied thereto.

The NOT circuit 65 is utilized to provide a reset to the flip-flop 51 from the trailing edge of the complement operation pulse. The output of the NOT circuit 65 is directed to a reset "A-C" input of flip-flop 51. Thus when the output of the AND gate 61 goes from true to false, the output of NOT circuit 65 goes from false to true and resets FF51 on the trailing edge of the complement operation pulse. In this manner, only one recirculating bit is affected by the control logic for each training signal generated by the goal circuit.

It will also be observed that although training signals may be applied to all statistical switches of the trainable logical network, only those switches to which an input is coincidentally applied will respond to the training signal. That is, only "active" switches can respond to the reward or punish signal supplied by the goal circuit, by virtue of the requirement of a switch input at AND gate 49 to permit switch operation.

While we have disclosed a preferred embodiment of our invention, it will be apparent that variations in the specific details of construction which have been illustrated and described may be resorted to without departing from the spirit and scope of the invention as defined in the appended claims.

We claim:

1. A statistical switch for use in a trainable logic network of the type in which logical functions of binary input variables applied to the network are formed at output terminals of the network, and wherein is provided a goal circuit for sensing the presence or absence of a desired logical function at said output terminals and for generating training signals representative respectively of reward or punishment in response thereto, said statistical switch comprising a multi-stage shift register; a loop for recirculating the contents of said shift register; means for selectively sampling a stage of the shift register as said contents are recirculated; gating means for selectively passing the binary input to the statistical switch as an output thereof in response to the sampled bit being of predetermined binary value; and control logic means in said loop responsive to binary inputs applied to said statistical switch, to said training signals, to bits recirculating through said loop, and to the sampled bit for changing the value of those of said recirculating bits resulting in an undesired logical function at said network output terminals.

2. The combination according to claim 1 wherein is included memory means for storing the bit obtained upon said selective sampling of said stage of said shift register, and for retaining the last-named bit while applying same to said gating means, until the next sampling of said stage of said shift register.

3. The combination according to claim 2 wherein said memory means comprises a flip-flop circuit.

4. The combination according to claim 1 wherein said contents of the shift register are recirculated at a rate substantially greater than the rate at which said statistical switch is sampled.

5. A statistical switch for selectively and variably passing binary signals applied thereto, said statistical switch comprising a multi-element shift register, each element having a capacity of one bit, means for recirculating the contents of said shift register, gating means responsive to a binary signal applied to said statistical switch and to the bit in a predetermined element of said shift register coincident therewith for transferring said binary signal as an output of said statistical switch when the last-named bit is of predetermined binary value, means for selectively applying said last-named bit to said gating means during recirculation of said contents, and means for varying the value of the recirculating bits to corresponding vary the probability that a binary signal applied to said statistical switch will be passed thereby.

6. The combination according to claim 5 wherein said means for selectively applying includes a one-bit memory means, and means for selectively storing the bit in said predetermined element of said shift register in said memory means for successive application to said gating means.

7. The combination according to claim 6 wherein said predetermined element is the last element of said shift register.

8. A digital switching device having a variable probability of passing or blocking a digital signal applied thereto, comprising a recirculating shift register, a gating circuit, means for applying a portion of the contents of said shift register to said gating circuit to direct the passage or blockage of said applied signal thereby, and means in the recirculating loop for selectively modifying the contents of said shift register according to a desired switching device response to that specific applied digital signal until said desired response to said signal is substantially continuous.

9. The invention according to claim 8 wherein said means for applying includes means for sampling said portion of the contents of said shift register at a rate much slower than the rate at which the contents of said register are recirculated.

10. The invention according to claim 8 wherein said signal is a binary signal and said contents are binary bits, said shift register having a plurality of stages each having a capacity of one bit, said portion being a bit in one of said stages; said means for selectively modifying comprises a control logic circuit responsive to signal representative of said switching device response for complementing the next recirculating bit received from said register which is not identical to the bit applied to said gating circuit from said register that produces said desired response.

11. The invention according to claim 10 wherein said control logic circuit is further responsive to said response-representative signal for complementing the next recirculating bit received from said shift register which is identical to a bit applied to said gating circuit from said shift register that produces an undesired response.

12. The invention according to claim 11 wherein said control logic circuit includes means for inhibiting further complementing of recirculating bits following the complementing of said next recirculating bit until again dictated by said response-representative signal.

References Cited

UNITED STATES PATENTS

| | | | |
|---|---|---|---|
| 3,328,772 | 6/1967 | Oeters | 340—172.5 |
| 3,325,787 | 6/1967 | Angell et al. | 340—172.5 |
| 3,302,176 | 1/1967 | McLaughlin | 340—172.5 |
| 3,107,344 | 10/1963 | Baker et al. | 340—172.5 |

GARETH D. SHAW, *Primary Examiner.*

U.S. Cl. X.R.

340—172.55